(12) United States Patent  (10) Patent No.: US 7,545,474 B2
Yang et al.  (45) Date of Patent: Jun. 9, 2009

(54) MANUFACTURING METHOD OF TRANSFLECTIVE LCD AND TRANSFLECTIVE LCD THEREOF

(75) Inventors: Yong-ho Yang, Seaoul (KR); Jun-ho Song, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 380 days.

(21) Appl. No.: 11/083,476

(22) Filed: Mar. 18, 2005

(65) Prior Publication Data

US 2006/0033868 A1    Feb. 16, 2006

(30) Foreign Application Priority Data

Mar. 18, 2004    (KR)    ...................... 10-2004-0018307

(51) Int. Cl.
G02F 1/1345 (2006.01)
G02F 1/1335 (2006.01)
G02F 1/1343 (2006.01)

(52) U.S. Cl. .................. 349/152; 349/114; 349/147; 349/149

(58) Field of Classification Search ................. 349/46, 349/149, 152, 147
See application file for complete search history.

(56) References Cited

U.S. PATENT DOCUMENTS

| 5,828,433 | A | * | 10/1998 | Shin | 349/147 |
| 6,683,666 | B1 | * | 1/2004 | Jang et al. | 349/113 |
| 2003/0197181 | A1 | * | 10/2003 | Yun | 257/72 |
| 2003/0197187 | A1 | * | 10/2003 | Kim et al. | 257/83 |
| 2004/0032550 | A1 | * | 2/2004 | Anno et al. | 349/110 |
| 2005/0078264 | A1 | * | 4/2005 | Yoo et al. | 349/152 |

* cited by examiner

*Primary Examiner*—David Nelms
*Assistant Examiner*—W. Patty Chen
(74) *Attorney, Agent, or Firm*—Cantor Colburn LLP (57) ABSTRACT

A manufacturing method of a transflective LCD comprising forming a multiple layer on a substrate by depositing transparent electrode layer and a gate metal layer sequentially, forming a gate line, a gate electrode, a gate pad forming part and a data pad forming part by patterning the multiple layer, forming a gate insulating layer, forming a semiconductor layer, forming a data line, a source electrode and a drain electrode, forming a passivation layer and an organic insulating layer and forming a gate pad and a data pad by providing contact holes exposing the transparent electrode layer on the gate pad forming part and the data pad forming part, respectively. Accordingly, it is an aspect of the present invention to provide a manufacturing method of a transflective LCD using less masks and a transflective LCD thereof.

2 Claims, 10 Drawing Sheets

MANUFACTURING METHOD OF TRANSFLECTIVE LCD AND TRANSFLECTIVE LCD THEREOF

CROSS-REFERENCE TO RELATED APPLICATIONS

This application claims the benefit of Korean Patent Application No. 2004-0018307, filed on Mar. 18, 2004, in the Korean Intellectual Property Office, the disclosure of which is incorporated herein by reference.

BACKGROUND OF THE INVENTION

1. Field of the Invention

The present invention relates to a manufacturing method of a transflective LCD and a transflective LCD thereof, and more particularly, to a manufacturing method of a transflective LCD using less masks and a transflective LCD thereof.

2. Description of the Related Art

An LCD comprises a liquid crystal panel containing liquid crystal disposed between a TFT substrate and a color filter substrate. Since the liquid crystal panel does not emit light by itself, the LCD may have a backlight unit disposed in the rear of the TFT substrate.

The LCD may be classified into a transmission type using a backlight as a light source and a reflection type using natural light as the light source. The transmission type has a backlight at the rear of the liquid crystal panel, and light from the backlight transmits through the liquid crystal panel. Such transmission type consumes much power to operate the backlight, and is weighty and thick. On the other hand, since the reflection type needs no backlight, it consumes less power and can be formed light and thin. However, the reflection type cannot be used when the natural light is dim.

To overcome the above disadvantages has been introduced a transflective LCD having both a reflection part and a transmission part.

Meanwhile, seven masks are usually used for manufacturing a TFT substrate for such transflective LCD. The masks are needed when forming a gate wiring, a semiconductor layer, a data wiring, a contact hole on a passivation layer, a contact hole and a lens layer on an organic insulating layer, a pixel electrode, and a reflection layer, respectively. However, when manufacturing the transmission type, four or five masks are usually used. As seen above, more masks are used when manufacturing the transflective type than when manufacturing the transmission type, and thereby lowering an efficiency in the manufacturing process of the transflective LCD.

SUMMARY OF THE INVENTION

Accordingly, it is an aspect of the present invention to provide a manufacturing method of a transflective LCD using less masks and a transflective LCD thereof.

The foregoing and/or other aspects of the present invention are also achieved by providing a manufacturing method of a transflective LCD comprising forming a multiple layer on a substrate by depositing transparent electrode layer and a gate metal layer sequentially, forming a gate line, a gate electrode, a gate pad forming part and a data pad forming part by patterning the multiple layer, forming a gate insulating layer, forming a semiconductor layer, forming a data line, a source electrode and a drain electrode, forming a passivation layer and an organic insulating layer, and forming a gate pad and a data pad by providing contact holes exposing the transparent electrode layer on the gate pad forming part and the data pad forming part, respectively.

According to the embodiment of the present invention the forming the passivation layer and the organic insulating layer comprises forming a data line connecting contact hole on the data pad and a data pad connecting contact hole on the data line, respectively.

According to the embodiment of the present invention, the manufacturing method further comprising forming a reflecting layer, wherein the reflecting layer connects the data line connecting contact hole with the data pad connecting contact hole.

The foregoing and/or other aspects of the present invention are also achieved by providing a transflective LCD comprising a plurality of gate lines and a plurality of data lines disposed on a substrate and intersecting each other, a gate pad connected to an end of the gate lines and a data pad connected to an end of the data lines, wherein a transparent electrode layer is formed between the substrate and the gate pad, and on the gate pad is formed a contact hole exposing the transparent electrode layer.

According to the embodiment of the present invention, a transparent electrode layer is formed between the substrate and the data pad, and on the data pad is formed a contact hole exposing the transparent electrode layer.

According to the embodiment of the present invention, the data pad is spaced from the data line, and a connecting reflection layer is formed to connect the data pad with the data line.

According to the embodiment of the present invention, a data line connecting contact hole is formed on the data pad so that the data pad is connected to the data line, a data pad connecting contact hole is formed on the data line so that the data line is connected to the data pad, and the connecting reflection layer connects the data pad with the data line through the data line connecting contact hole and the data pad connecting contact hole.

According to the embodiment of the present invention, the reflecting layer is located within an area where liquid crystal is disposed.

According to the embodiment of the present invention, the gate line and the gate pad have a Mo single layered structure or a Mo/Al/Mo triple layered structure, and the reflecting layer has a Al single layered structure or a Al/Mo double layered structure.

BRIEF DESCRIPTION OF THE DRAWINGS

The above and/or other aspects and advantages of the present invention will become apparent and more readily appreciated from the following description of the exemplary embodiments, taken in conjunction with the accompanying drawings of which.

DETAILED DESCRIPTION OF THE PREFERRED EMBODIMENT

Reference will now be made in detail to exemplary embodiments of the present invention, examples of which are illustrated in the accompanying drawings, wherein like reference numerals refer to like elements throughout. The embodiments are described below in order to explain the present invention by referring to the figures.

Hereinafter a first embodiment will be described in the followings by referring to the figures.

Figure 1:
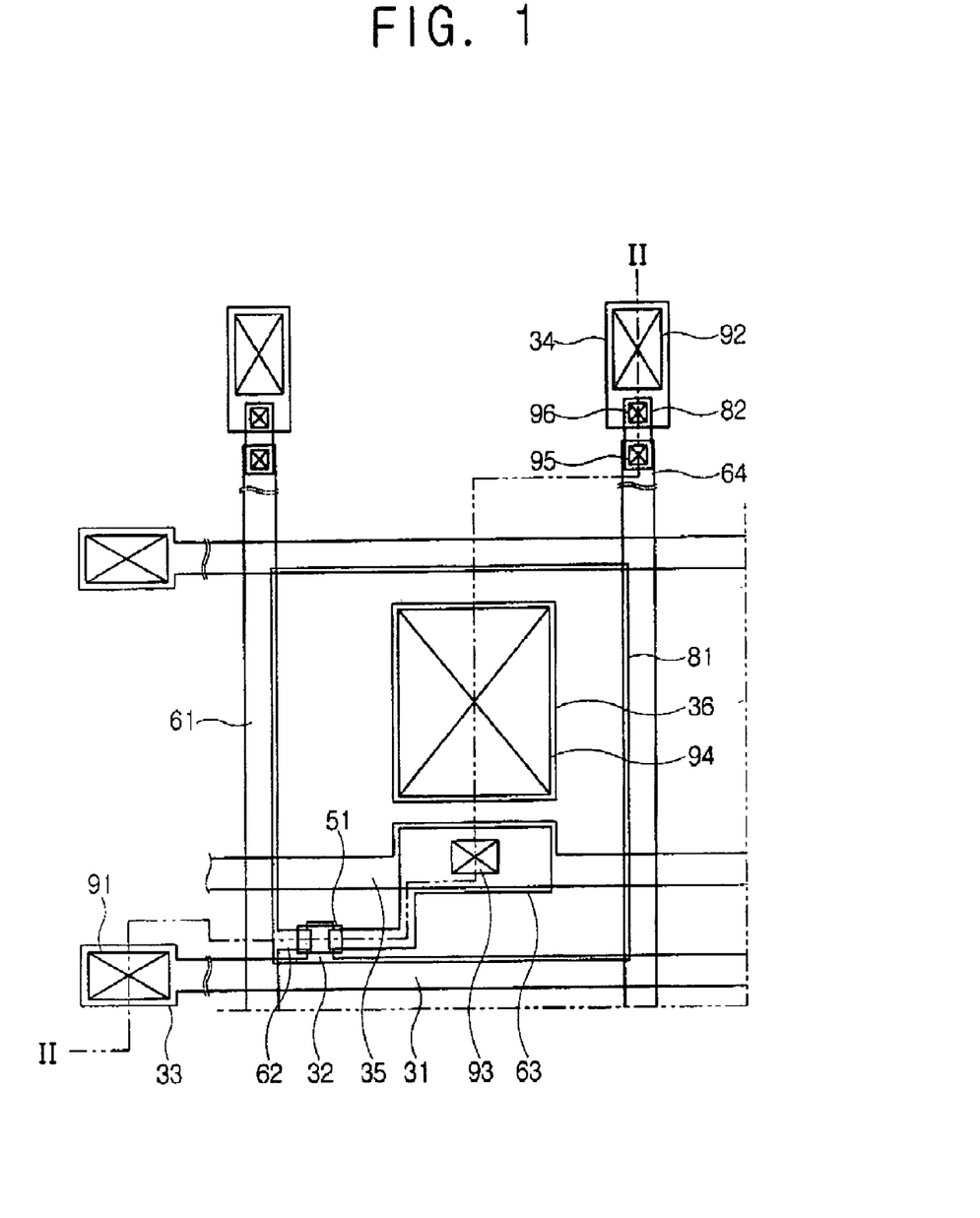
FIG. 1 is a layout view of a TFT substrate according to a first embodiment of the present invention.
Figure 2:
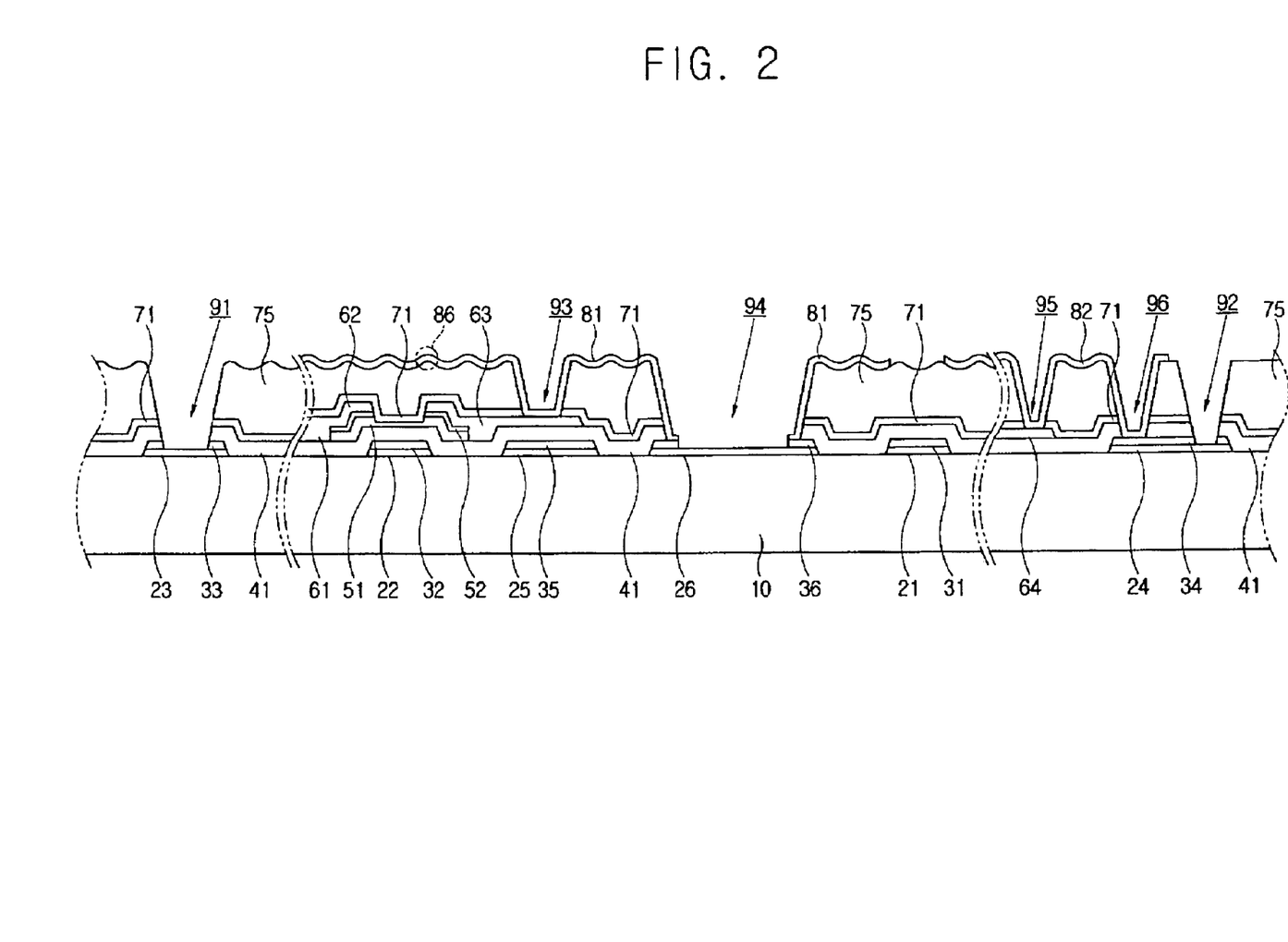
FIG. 2 is a sectional view taken along the line II-II of FIG. 1.

On a substrate 10 are formed transparent electrodes 21, 22, 23, 24, 25 and 26. On the transparent electrodes 21, 22, 23, 24, 25 and 26 are formed a gate wiring 31, 32, 33, 35 and 36 and a data pad 34. The gate wiring 31, 32, 33, 35 and 36 comprises a plurality of gate lines 31 disposed parallel at predetermined intervals, a gate electrode 32 extended from the gate line 31 and forming a TFT, a gate pad 33 connecting the gate line and a gate driving circuit, a storage capacitor line 35 forming a storage capacitor and a transmission area gate part 36 disposed in a transmission area. The data pad 34 connects a data line 61 and a data driving circuit. The gate pad 33 and the data pad 34 are wider in width than the gate line 31.

The transparent electrodes 21, 22, 23, 25 and 26 and the corresponding gate wiring 31, 32, 33, 35 and 36, and the transparent electrode 24 and the corresponding data pad 34 are disposed at the approximately same positions on the substrate 10, respectively. Central areas of the gate pad 33, the data pad 34 and the transmission area gate part 36 are removed so that the transparent electrodes 23, 24 and 26 are exposed.

The transparent electrodes 21, 22, 23, 24, 25 and 26 are commonly made of ITO (indium tin oxide) or IZO (indium zinc oxide). The gate wiring 31, 32, 33, 35 and 36 and the data pad 34 preferably have a Mo single-layered structure or a Mo/Al/Mo triple-layered structure.

On the gate wiring 31, 32, 33, 35 and 36 and the data pad 34 is formed a gate insulating layer 41. The gate insulating layer 41 is typically made of silicon nitride. The gate insulating layer 41 is removed at a gate pad contact hole 91, a data pad contact hole 92, a transmission window 94, and a data line connecting contact hole 96.

A semiconductor layer 51 is disposed on the gate electrode 32 and made of amorphous silicon. On the semiconductor layer 51 is formed an ohmic contact layer 52. The ohmic contact layer 52 is divided into two parts with the gate electrode 32 being therebetween. The ohmic contact layer 52 is typically made of n+ silicon.

A data wiring 61, 62, 63, 64 and 34 comprises a plurality of data lines 61 disposed parallel and approximately perpendicular to the gate lines 31, a source electrode 62 branched out from the data line 61, a drain electrode 63 opposing the source electrode 62 with the gate electrode 32 being therebetween, a data fan out 64 extended from the data line 61 and the data pad 34. The data fan out 64 is disposed at a non-display area, and connects the data line 61 with the data pad 34. The data wiring 61, 62, 63, 64 and 34 may be made of Al, Cr, Mo or alloy thereof.

On the data wiring 61, 62, 63 and 64 and the semiconductor layer 41 not covered by the data wiring 61, 62, 63 and 64 is formed a passivation layer 71. The passivation layer 71 is typically made of silicon nitride. Like the gate insulating layer 41, the passivation layer 71 is removed at the areas where the gate pad contact hole 91, the transmission window 94, the data pad contact hole 92 and the data line connecting contact hole 96 are formed. In addition, the passivation layer 71 is removed at the areas where the drain electrode contact hole 93 and the data pad connecting contact hole 95 are formed.

On the passivation layer 71 is formed an organic insulating layer 75. The organic insulating layer 75 is typically made of photosensitive material and forms a lens part 86 at a reflection area, thereby increasing the reflection efficiency. Like the passivation layer 71, the organic insulating layer 75 is removed at the areas where the gate pad contact hole 91, the transmission window 94, the data pad contact hole 92, the data line contact hole 96, the drain electrode contact hole 93 and the data pad contact hole 95 are formed. Further, the organic insulating layer 75 may be removed at the non-display area where the gate pad 33, the data pad 34, the data fan out 64, a gate fan out (not shown) are disposed.

On the organic insulating layer 75 is formed a reflecting layer 81. The reflecting layer 81 is typically made of Al or Ag, and may be Al/Mo double layer, if necessary. The reflecting layer 81 is connected to the drain electrode 63 through the drain electrode contact hole 93, and connected to the transparent electrode 26 of the transmission window 94 through the transmission area gate part 36. The reflecting layer 81 is removed at the areas where transmission window 94, the gate line 31, and the non-display area are disposed. A connecting reflection layer 82 is disposed at the non-display area, and connects the data fan out 64 exposed through a data pad connecting contact hole 95 with the data pad 34 exposed through the data line connecting contact hole 96.

With the above configuration, the driving circuit is connected through the gate pad 33 and the data pad 34. Central areas of the gate pad 33 and the data pad 34 are removed so that the transparent electrodes 23 and 24 therebelow are exposed. The driving circuit is in contact with the transparent electrodes 23 and 24. Since the data pad 34 has an area to be connected to the data fan out 64, the data pad 34 is somewhat larger than the gate pad 33. The data pad 34 is not directly connected to the data line 61 or the data fan out 64 extended from the data line 61, but electrically connected thereto through the connecting reflecting layer 82.

The connecting reflection layer 82 is preferably disposed within a seal line, along which a TFT substrate and a color filter substrate are bonded, to prevent from being corroded. Therefore, the connecting reflection layer 82 is disposed within the liquid crystal area.

Hereinafter, a manufacturing method of a TFT according to the first embodiment of the present invention will be described.

Figure 3A:
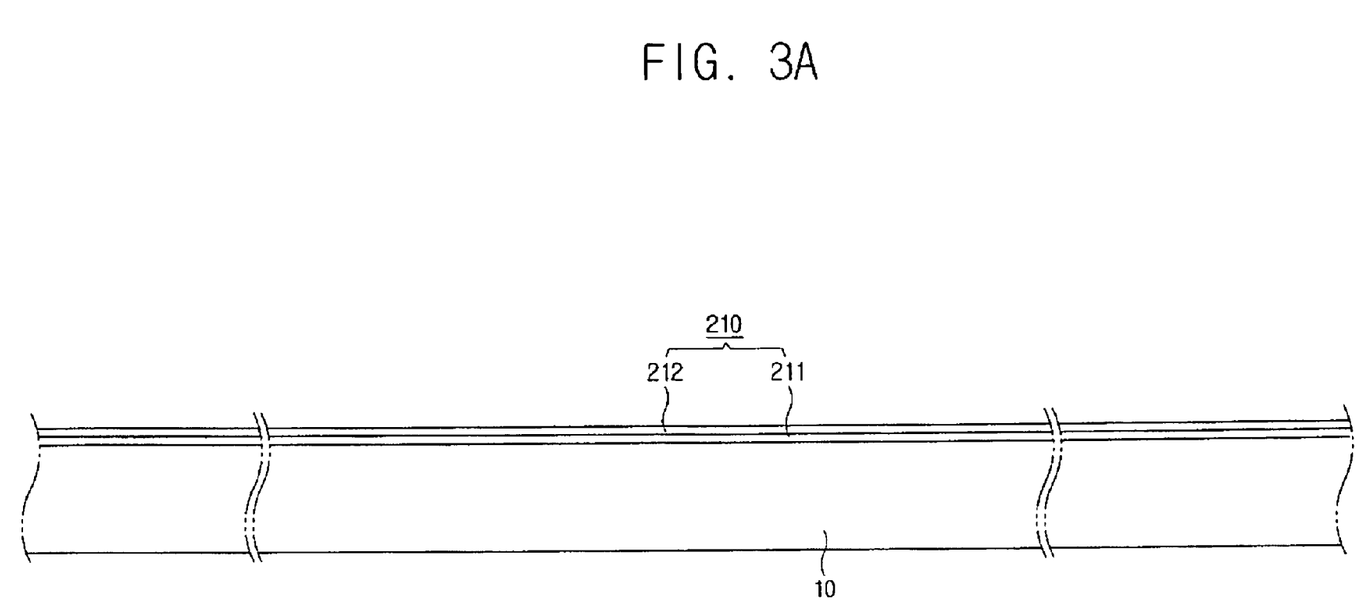
FIGS. 3a to 3e are sectional views illustrating a manufacturing method of a TFT substrate according to the first embodiment of the present invention.
Figure 3B:
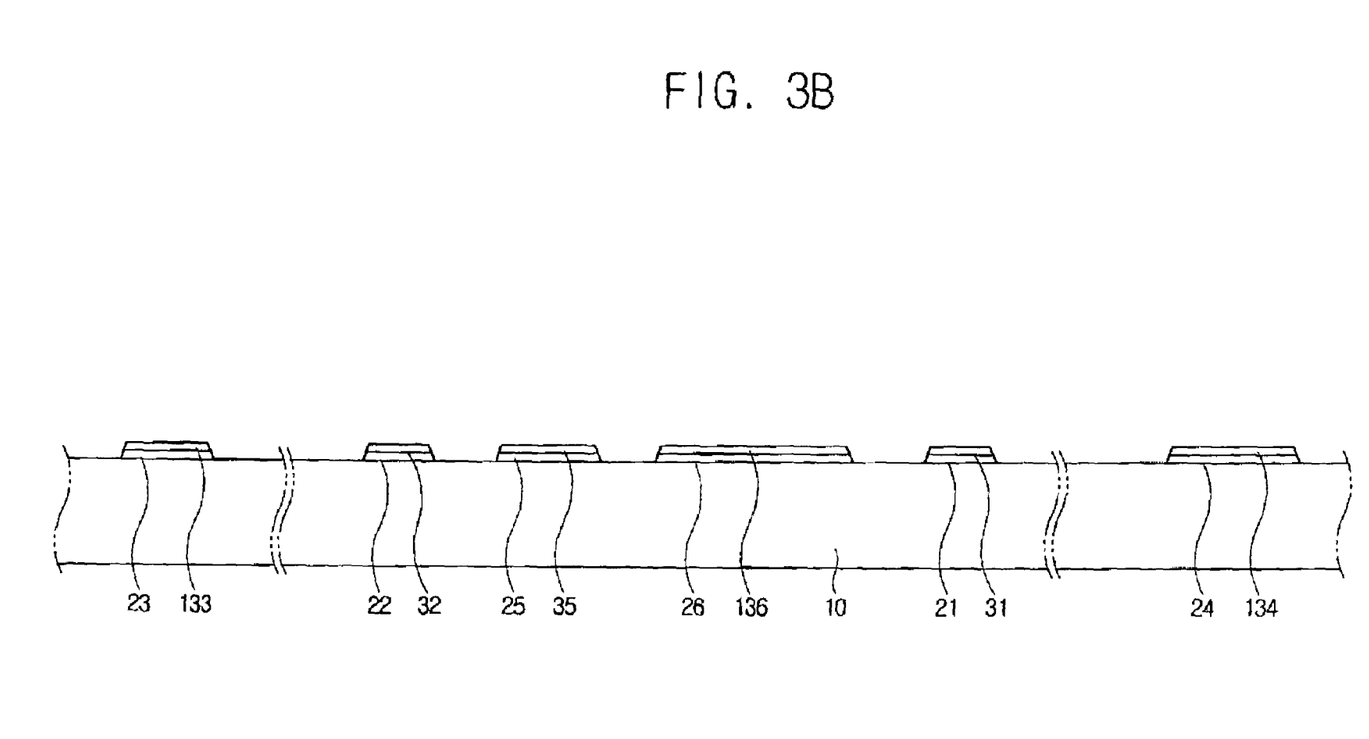

First, as shown in FIGS. 3a and 3b, on the substrate 10, a transparent electrode layer 211 and a gate metal layer 212 are disposed sequentially, thereby forming a multiple layer 210. Next, the multiple layer 210 is patterned (a first mask is used) to form the gate line 31, the gate electrode 32, a gate pad forming part 133, a data pad forming part 134, the storage capacitor line 35, the transmission area gate part forming part 136 and corresponding transparent electrodes 21, 22, 23, 24, 25 and 26 disposed underthere. The gate metal layer 212 may be made of Cr, Ti, Ta or etc. However, considering the reflecting layer's material, which will be described later, the gate metal layer 212 is preferably made of a Mo single layer or a Mo/Al/Mo triple layer.

Central areas of the gate pad forming part 133, the data pad forming part 134, and the transmission area gate part forming part 136 are removed to form the gate pad 33, the data pad 34 and the transmission area gate part 36, respectively. The transparent electrode 23 below the gate pad 33 and the transparent electrode 24 below the data pad 34 are in contact with the driving circuit. The transparent electrode 26 below the transmission area gate part 36 becomes the transmission area and supplies electric signals to the liquid crystal disposed thereon.

Figure 3C:
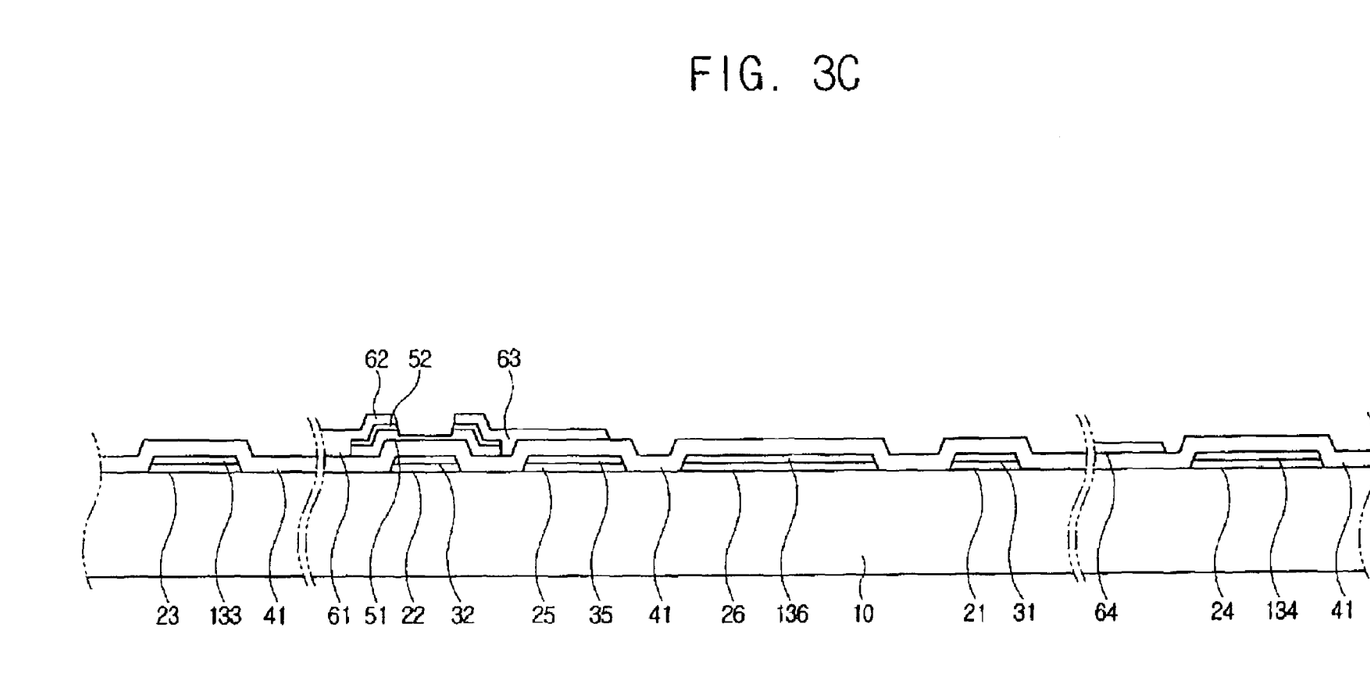

Next, as shown in FIG. 3c, the gate insulating layer 41, the semiconductor layer 51, the ohmic contact layer 52, and the data wiring 61, 62, 63 and 64 are formed.

Details about a forming process are set out as follows. The gate insulating layer 41 typically made of silicon nitride, the semiconductor layer 51 typically made of amorphous silicon and the ohmic contact layer 52 typically made of n+ silicon are deposited sequentially. Here, the semiconductor layer 51 and the ohmic contact layer 52 are patterned (a second mask is used), and remains only on the gate electrode 32. The semiconductor layer 51 and the ohmic contact layer 52 may be formed at an intersection of the gate line 31 and the data line 61.

After forming the semiconductor layer 51 and the ohmic contact layer 52, the data metal layer is deposited and patterned (a third mask is used) to form the data line 61, the source electrode 62, the drain electrode 63, and the data fan out 64. The data fan out 64 is separated from the data pad forming part 134, thus they are not connected each other.

Figure 3D:
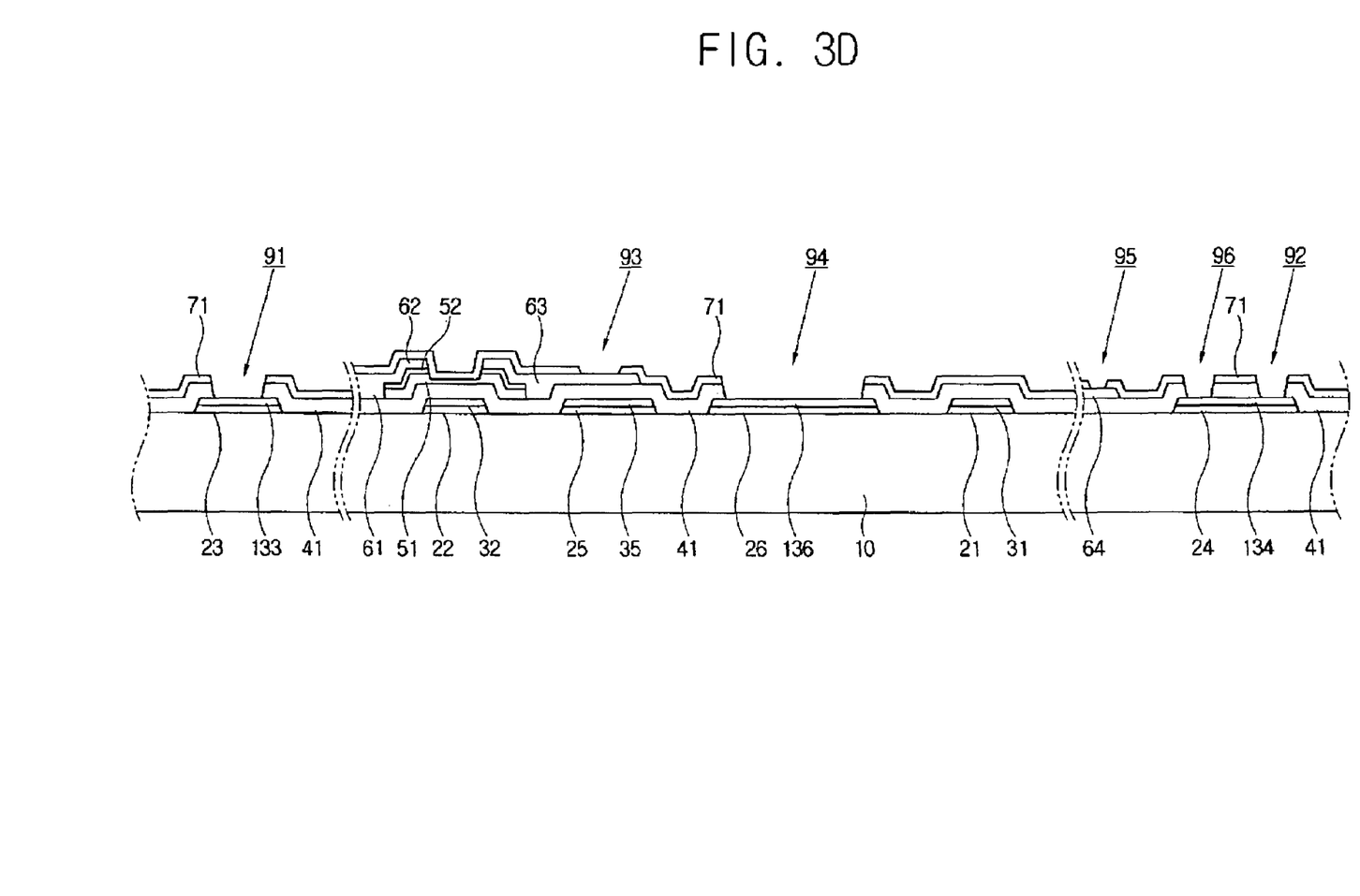

Afterward, as shown in FIG. 3d, the passivation layer 71 is deposited and patterned (a fourth mask is used). The passivation layer 71 is typically made of silicon nitride. By such patterning, the passivation layer 71 is removed at the areas where the gate pad contact hole 91, the data pad contact hole 92, the drain electrode contact hole 93, the transmission window 94, the data pad connecting contact hole 95, and the data line connecting contact hole 96 are disposed. When removing the passivation layer 71, the gate insulating layer 41 below the passivation layer 71 is also removed except the areas where the drain electrode contact hole 93 and the data pad connecting contact hole 95 are formed. In this step, the contact holes 91, 92 and 96, with the exception of the drain electrode contact hole 93 and the data pad connecting contact hole 95, and the transmission window 94 have the gate metal layer.

Figure 3E:
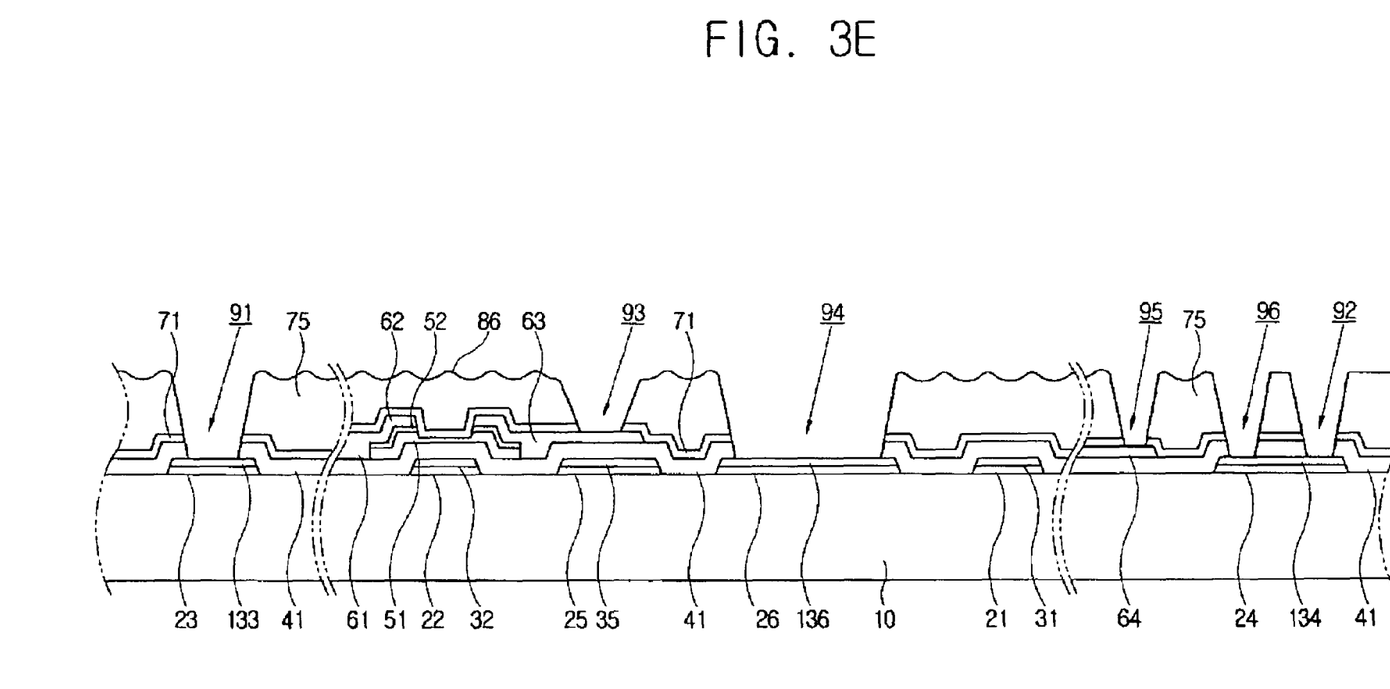

As shown in FIG. 3e, after the passivation layer 71 is formed, the organic insulating layer 75 is formed and then patterned (a fifth mask is used). The organic insulating layer 75 is typically made of photosensitive material. By using the photosensitive material, the organic insulating layer 75 can be patterned only by exposing to light and developing without an etching. Like the passivation layer 71, the organic insulating layer 75 is removed at the areas where the gate pad contact hole 91, the data pad contact hole 92, the drain electrode contact hole 93, the transmission window 94, the data pad connecting contact hole 95, and the data line connecting contact hole 96 are formed. The organic insulating layer 75 of the non-display area may be also removed, if necessary.

The patterning for forming the organic insulating layer 75 is also used for forming the lens part 86 on the organic insulating layer 75. In other words, the surface of the organic insulating layer 75 becomes uneven through this patterning, and such uneven surface becomes the wavy lens part 86 by a heat treatment. The shape of the lens part 86 decides the shape of the reflecting layer 81 formed thereon, so that the reflecting layer 81 can reflect the outside light efficiently.

The passivation layer 71 and the organic insulating layer 75 may be formed through other processes. For example, the passivation layer 71 and the organic insulating layer 75 are deposited sequentially, and afterward, the organic insulating layer 75 and the passivation layer 71 are patterned sequentially. The above two methods have the same desired result, but the contact holes may have different shapes. Although the two processes are different in order, both the two processes use a mask for patterning the passivation layer 71 and a mask for patterning the organic insulating layer 75. Anyway, the two processes use the same number of masks.

After the organic insulating layer 75 is formed, the reflecting layer 81 is formed (a sixth mask is used), thereby completing the TFT shown in FIG. 2. The reflecting layer 81 may be made of Ag, Cr or alloy thereof, but is preferably made of Al or an Al/Mo double layer. Mo and Al can be etched by the same etching solution, for example, mixed solution of nitric acid, phosphoric acid and/or acetic acid. Accordingly, in the case that both the reflecting layer 81 and the gate metal layer are made of Mo and/or Al, the reflecting layer 81 and the gate metal layer are etched by the one etching solution.

The reflecting layer 81 is not formed only at the transmission window 94 in the display area. Since the reflecting layer 81 is formed on the lens part 86, the reflecting layer 81 also has a wavy shape. The reflecting layer 81 is connected to the drain electrode 63 through the drain electrode contact hole 93 to receive electric signals. Such electric signals are supplied to the crystal liquid disposed on the reflecting layer 81. The reflecting layer 81 is connected to the transparent electrode 26 of the transmission area with the transmission area gate part 36 being interposed therebetween.

While patterning the reflecting layer 81, the gate metal layer on the gate pad forming part 133, the data pad forming part 134, and the transmission area gate part forming part 136 is partly removed to expose the transparent electrodes 23, 24 and 26. Accordingly, the gate pad 133, the data pad 134, and the transmission area gate part 36 are formed. When forming the gate pad 133, the data pad 134, and the transmission area gate part 36, the etching solution of the reflecting layer 81 is preferably used.

During the patterning of the reflecting layer 81, the connecting reflecting layer 82 connecting the data fan out 64 exposed to the data pad connecting contact hole 95 with the data pad 34 exposed to the data line connecting contact hole 96 is formed. With this configuration, the signals transmitted from the data driving circuit to the data pad 34 are supplied to the data fan out 64 and the data line 61 through the connecting reflection layer 82.

According to the first embodiment described above, a transflective TFT can be fabricated by using six masks.

According to the first embodiment, the gate metal layer of the gate pad 33 is removed at its central area to expose the transparent electrode 23. The exposed transparent electrode 23 is connected to the gate driving circuit, and supplies signals transmitted from the gate driving circuit to the gate pad 33. The data pad 34 is formed of the gate metal layer, and is connected to the data fan out 64 by the connecting reflection layer 82. The transparent electrode 24 of the data pad 34 is exposed in the same manner as that of the gate pad 33.

Figure 4:
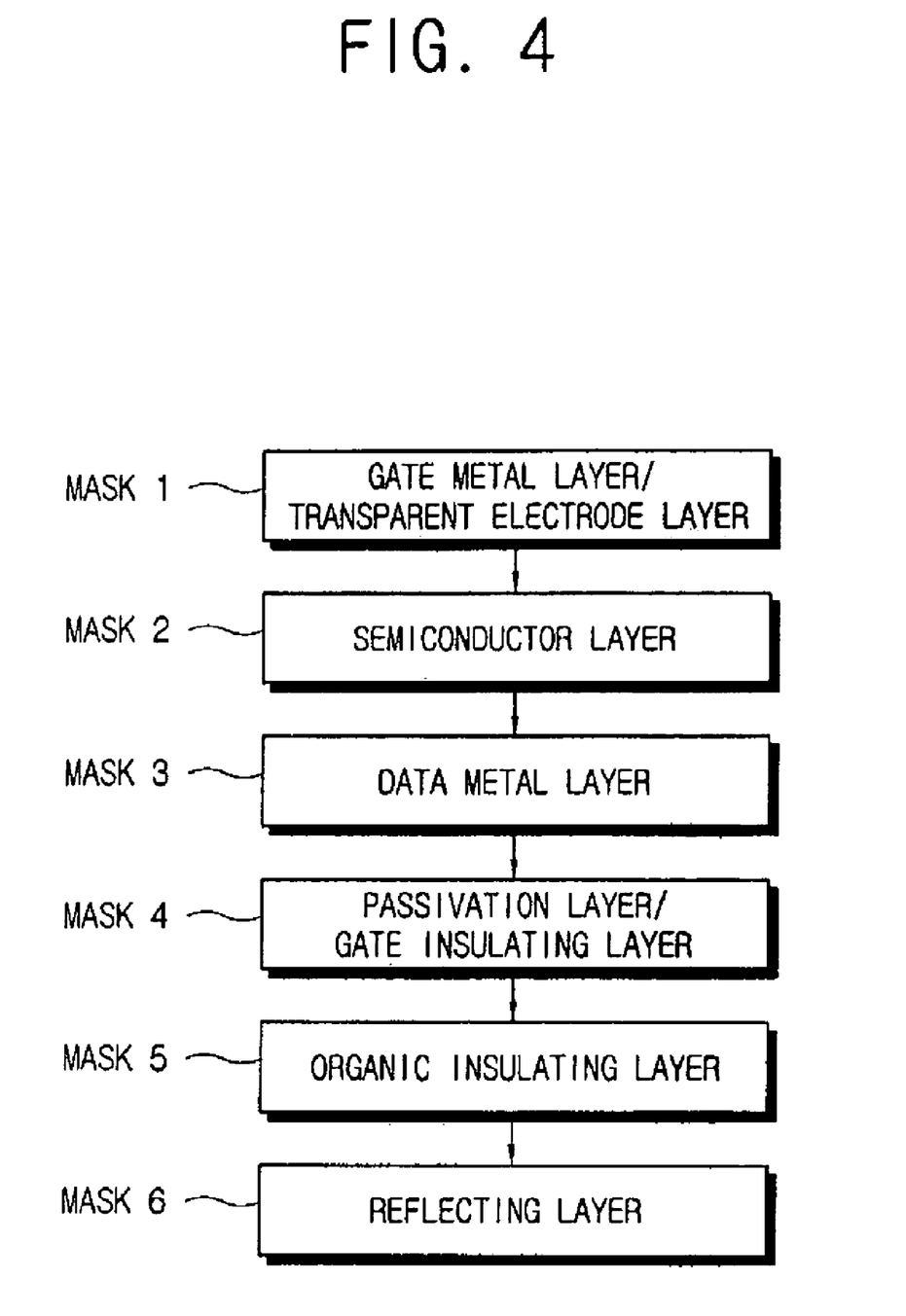
FIG. 4 is a flow chart showing a manufacturing method of a TFT substrate according to the first embodiment of the present invention.

Below here, a manufacturing process of a TFT according to the first embodiment of the present invention will be described in sequence of the masks.

First, on the substrate 10, the transparent electrode layer and the gate metal layer are deposited sequentially and patterned (the first mask). In this step, the gate line 31 and the gate electrode 32 are formed and the transmission area, which will be formed in the following step, is determined. Also, in the following step are formed the areas for the gate pad 33 and the data pad 34.

Next, the semiconductor layer 51 (the ohmic contact layer is included) is formed (the second mask). The semiconductor layer 51 is disposed on the gate electrode 32, and also may be formed at an intersection of the gate line 31 and the data line 61.

Subsequently, the data metal layer is deposited and patterned (the third mask). By this, the data line 61, the source electrode 62 and the drain electrode 63 are formed. The data fan out 64 connected to the data line 61 is formed to be connected to the data pad 34 in the following step.

Afterward, the passivation layer 71 is deposited and patterned (the fourth mask). While patterning the passivation layer 71, the gate insulating layer 41, which is formed earlier, may be patterned together, if necessary. By this, the contact holes 91, 92, 93, 95 and 96 are formed.

After the passivation layer 71 is patterned, the organic insulating layer 75 is patterned (the fifth mask). The patterning of the organic insulating layer 75 is similar to that of the passivation layer 71, but the organic insulating layer 75 of the reflection area has the lens part 86. Here, the passivation layer 71 may be patterned after the organic insulating layer 75 is patterned as described above.

Finally, the reflecting layer 81 is deposited and patterned (the sixth mask). The reflecting layer 81 is formed on the lens part 86 disposed in the reflection area, and contacts the drain electrode 63 and the transparent electrode 26 of the transmission area. Here, the reflecting layer 81 is preferably connected to the transparent electrode 26 through the gate metal layer. Further, a part of the reflecting layer 81 is formed to connect the data pad 34 and the data fan out 64.

Hereinafter, a second embodiment of the present invention will be described by referring to the figures.

Figure 5:
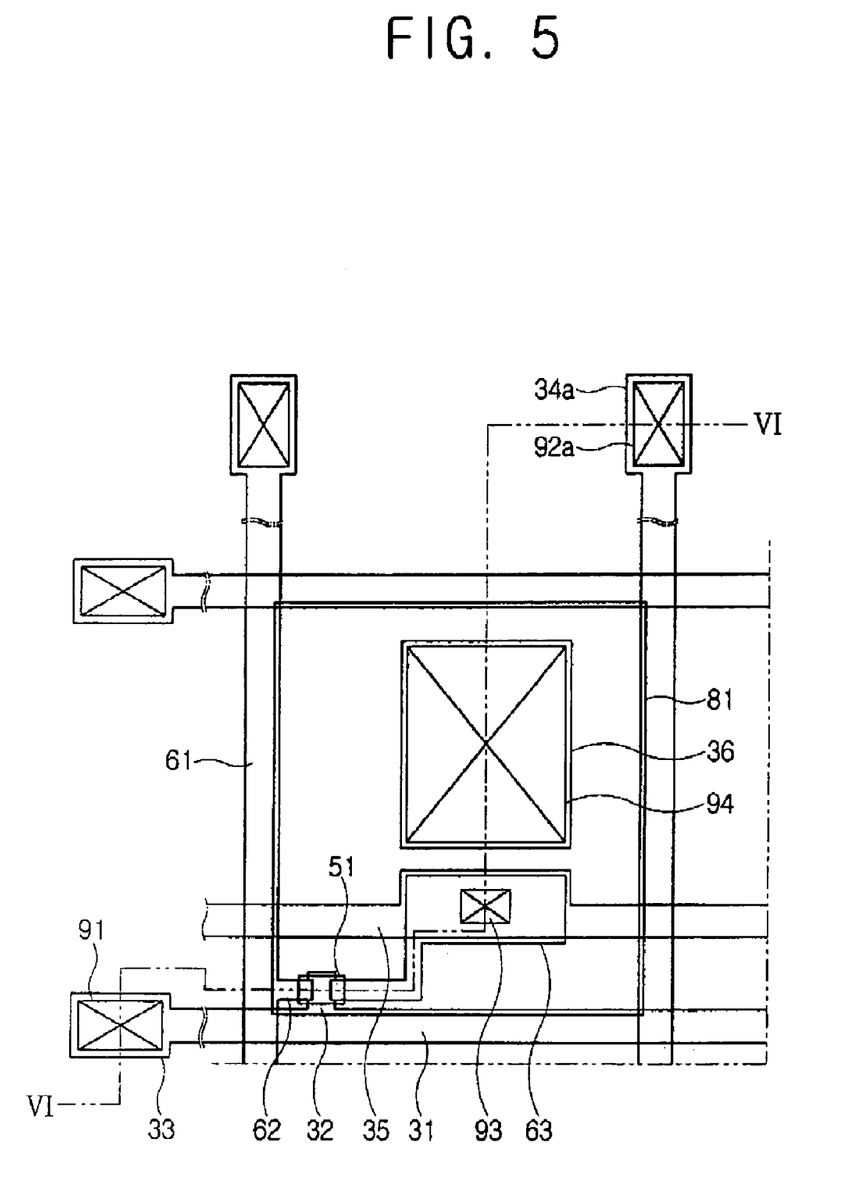
FIG. 5 is a layout view of a TFT substrate according to a second embodiment of the present invention.
Figure 6:
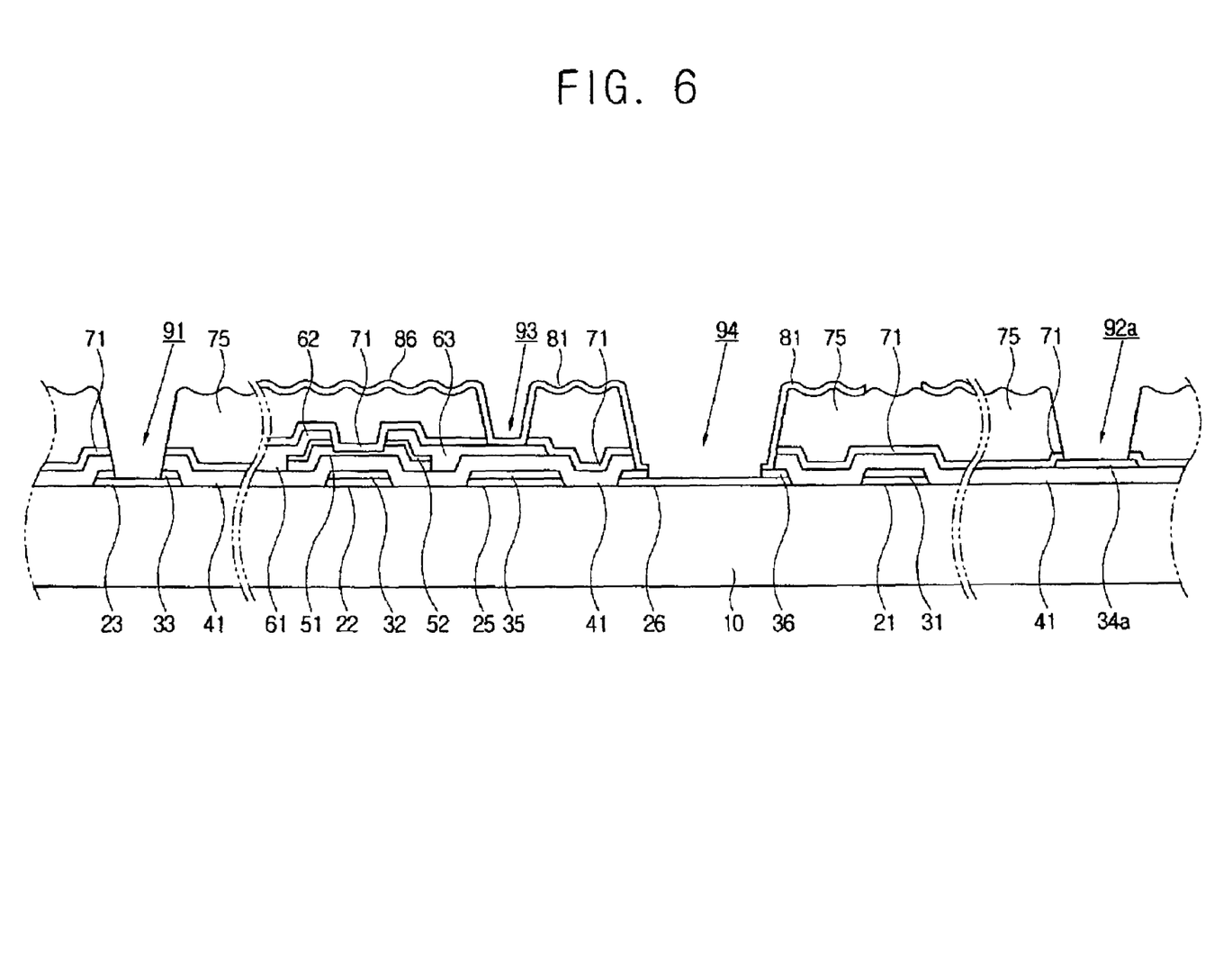
FIG. 6 is a sectional view taken along the line VI-VI of FIG. 5.

Referring to FIGS. 5 and 6, a data pad 34*a* is formed not by a gate metal layer but by a data metal layer. Since the data pad 34*a* is connected to a data line 61, a reflecting layer 81 doesn't need to connect them. A transparent electrode is not disposed between the data pad 34*a* and a substrate 10. Under the data pad 34*a* is formed a gate insulating layer 41.

Unlike a gate pad 33, the data pad 34*a* is not removed at its center. That is, to form the data pad contact hole 92*a*, only the organic insulating layer 75 and passivation layer 71 are removed. A data driving circuit is in direct contact with the data pad 34*a*.

Except the above, a manufacturing method of a TFT according to the second embodiment of the present invention is similar to a method according to the first embodiment of the present invention. Therefore, also in the second embodiment, six masks are used.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A manufacturing method of a transflective LCD, the method comprising:
    forming a multiple layer on a substrate by depositing transparent electrode layer and a gate metal layer sequentially;
    forming a gate line, a gate electrode, a gate pad forming part and a data pad forming part by patterning the multiple layer;
    forming a gate insulating layer;
    forming a semiconductor layer;
    forming a data line, a source electrode and a drain electrode;
    forming a passivation layer, an organic insulating layer and a data line connecting contact hole exposing the gate metal layer of the data pad forming part;
    forming a reflecting layer; and
    forming a gate pad contact hole exposing the transparent electrode layer on the gate pad forming part and a data pad contact hole exposing the transparent electrode layer on the data pad forming part to form a gate pad and a data pad, which are formed of the multiple layer;
    wherein the reflecting layer electrically connects the data line to the data pad through the data line connecting contact hole and the data pad contact hole.

2. The manufacturing method of claim 1, wherein the forming the passivation layer and the organic insulating layer comprises forming a data pad connecting contact hole on the data line.

* * * * *